J. K. ELDERKIN, Jr.
CONTROLLING SWITCH FOR SYNCHRONOUS MOTORS, ROTARY CONVERTERS, AND SYNCHRONOUS RECTIFIERS.
APPLICATION FILED JULY 30, 1914.
1,262,187.
Patented Apr. 9, 1918.
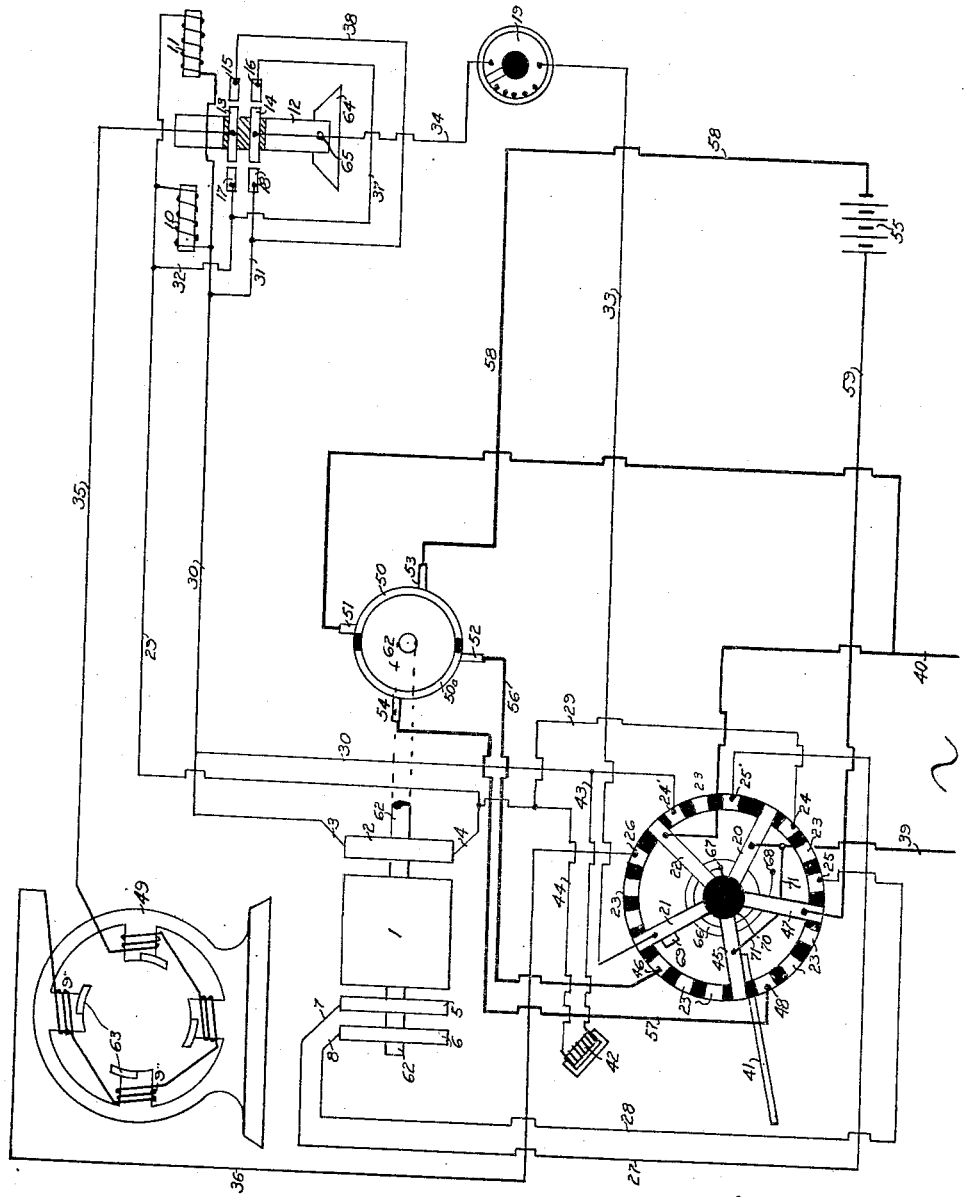
Inventor:
James K. Elderkin, Jr.
By [signature]
his attys

UNITED STATES PATENT OFFICE.

JAMES KNOX ELDERKIN, JR., OF DENVER, COLORADO, ASSIGNOR, BY MESNE ASSIGNMENTS, TO DAVID J. NEWLAND, OF YONKERS, NEW YORK.

CONTROLLING-SWITCH FOR SYNCHRONOUS MOTORS, ROTARY CONVERTERS, AND SYNCHRONOUS RECTIFIERS.

1,262,187.  Specification of Letters Patent.  Patented Apr. 9, 1918.

Application filed July 30, 1914. Serial No. 854,070.

*To all whom it may concern:*

Be it known that I, JAMES KNOX ELDERKIN, Jr., a citizen of the United States, residing in the city and county of Denver, State of Colorado, have invented new and useful Improvements in Controlling-Switches for Synchronous Motors, Rotary Converters, and Synchronous Rectifiers, of which the following is a specification, reference being had to the drawings accompanying and forming a part of the same.

My invention relates to controlling switches for synchronous alternating current motors, rotary converters or the like and its purpose is to start such motors so as to always synchronize, with the field excited at the same polarity, also to provide means by which the motor connections are opened automatically should the alternating current in the supply line fail, and also to close and open one or more external and independent circuits which are dependent upon the same A. C. source of supply for their current.

The invention is illustrated in the accompanying drawing which represents a diagrammatic circuit arrangement for a single phase synchronous alternating current motor connected to an alternating current rectifier supplied from the same source of alternating current and embodying the controlling switch and relay for synchronizing in one direction.

Referring to the drawing, 1 designates the armature of the motor 49 removed from the field frame for convenience in illustrating, 2 represents the commutator connected to the windings of armature 1, 3 and 4 are brushes bearing on commutator 2, 5 and 6 are slip rings also connected to the windings of the armature 1 in the manner known to those skilled in the art, 7 and 8 are brushes bearing on rings 5 and 6, 9 is the series field winding of said motor 49. The polarized relay device comprises the following elements; 10 and 11 are the two coils of the relay, 12 the polarized armature of the relay which in this case consists of a steel magnet pivoted at 65 to a base 64, 13 and 14 are contacts on the armature, 15 and 16 are connections which coöperate respectively with the contacts 13 and 14 of the armature 12 when the armature reacts to the right, 17 and 18 are connections which coöperate respectively with the contacts 13 and 14 of the armature when it reacts to the left. 19 is a field rheostat which is connected in series with the field 9 of the motor. The starting switch in the figure comprises: the contact arms 20, 21, 22, 45 and 47 insulated from each other at and fastened to the common hub 70. The outer ends of these arms wipe over a circle of contact elements of which 23 represent dead or not connected contacts, 24 and 24' represent starting contacts for the motor, 25 and 25' represent running contacts for the motor, 26 the field contact for the motor; 27 to 59 inclusive are interconnecting wires, 39 and 40 are the alternating current mains, 41 is an iron armature secured to the switch arm 20, 42 is an electro-magnet energized through a circuit connection with the commutator brushes 3 and 4 by means of the wires 43 and 44 and it is placed so as to hold the switch arms on the contacts 25, 25', 26, 46 and 48 by means of the armature 41, against the tension of a spring 66, fastened at its inner end 67 to the switch hub 70 and at its outer end to a fixed point 68. This spring normally tends to hold the switch in the "open" position with its arm 21 abutting against the insulated fixed stop 69. 63 represents short circuited rings around the trailing face of the polar projections of the motor 49 for starting purpose, such a motor being described in my copending application Ser. No. 78,880, filed February 17, 1916. 72 represents a rectifier of the synchronous rotating type and the rotating element has 5 segments 50 and 50ᵃ, inactive segments 61 and 61ᵃ and brushes 51, 52, 53 and 54 bearing on the same. 62 is the shaft of the motor which is common to the armature and rectifier. Now for convenience, we will follow out the connections for the operation of the motor represented by light lines and will take up the rectifier circuits. Now when the switch is actuated by hand in the direction of the arrow so that the arm 20 moves on the contact 24 and the arm 22 on the contact 24', the alternating current from the mains 39 and 40 flows by way of arms 20 and 22 over the wires 29 and 30 to the brushes 3 and 4, bearing on the commutator 2. The motor now starts and comes up to above synchronous speed as a repulsion motor due to the coils 63 on the trailing pole faces of the motor 49, the direction of rotation of course always being the same. The switch is then turned further so that the arm 20 contacts with the contact 25 and the arm 22 with the contact 25', and the alternating current from the line, 39 and 40, now enters the slip rings 5 and 6 by way of the wires 27 and 28, and brushes 7 and 8 respectively. At this time direct current the polarity of which cannot be determined, flows from the commutator 2 over the brushes 3 and 4 and the wires 29 and 30 into the coils 10 and 11 of the relay and also the relay contacts 16, 17 and 15, 18 respectively are connected by means of the wires 37, 32, 29 and 38, 31 30 to brushes 4 and 3 respectively. Now the relay armature 12, which is a polarized steel magnet, and normally rests in its central or open position as shown on the drawing, moves either to right or left according to the direction in which the current from the direct current commutator 2 flows through electromagnets 10 and 11. Now let us assume that armature 12 be polarized so that its north pole is at the lower end and its south pole at the upper, free end. Then if the direct current at brush 3 should be positive, the inner end of electromagnet 11 becomes a north pole and that of electromagnet 10 a south pole. Therefore the armature tilts to the right and contacts 13, 15 and 14, 16 respectively close, which connects lead 35 from the right hand end of field coil 9 directly to the positive brush 3, and lead 36 from the other end of the field coil 9, through contact 26, switch arm 21, lead 33, rheostat 19, lead 34, contacts 14, 16 and leads 32, 29 to the negative brush 4. Should the brush polarity be reversed, armature 12 moves to the left and the right hand end of field coil 9 is again connected with the positive brush (this time 4) through contacts 13, 17 and leads 32, 29. The other connections are correspondingly reversed so that the left hand end of field coil 9 is connected with the then negative brush 3. Thus whichever way the armature 12 tilts, the current enters the field 9 always the same way by means of the wires 34 and 35 and the rheostat 19 and the wire 33 and the third arm 21 of the switch and the contact 26. Now at the same time the electromagnet 42 is energized from the leads 43 and 44 which conduct direct current from the commutator 2 by means of connections with wires 29 and 30. The armature 41 is therefore attracted by electro-magnet 42, thereby holding the switch in the running position. Should there be an interruption in the current flow in the alternating current mains 39 and 40, and a consequent stoppage of the motor, no direct current would flow from the commutator 2 to energize the electromagnet 42, and the electro-magnet would therefore release its magnetic hold on the armature 41 and the switch would rock back to its "open" position under the influence of spring 66.

Having thus described the action of the switch and relay as regards the motor circuits, we will now take up the rectifier circuits with respect to the switch. These circuits are shown in heavy lines. The switch shows two additional arms 45 and 47 which are connected into the alternating current and direct current circuits of the rectifier so that upon the failure of current in the alternating current line, the battery under charge cannot react back on the rectifier, as my switch will open in such a case and thereby open all circuits.

The contact circle of the switch has two more "live" contacts 46 and 48 connected as will be described hereinafter. Arm 45 is permanently connected to arm 20 by means of wire 71.

Let us assume battery 55 for example should be charged from the alternating current mains 39, 40 by means of the rectifier 72 driven by the motor 49. The particular type of rectifier illustrated is disclosed in a copending application Serial Number 854,112 by Daniel T. Dobyns, filed of even date herewith. 20, 21, and 22 are the arms for the motor control as specified, 45 and 47 are two additional arms for the rectifier circuits, of which 47 is permanently connected with the minus pole of battery 55; 49 is the motor, 72 the rectifier comprising two ring halves 50, 50$^a$, insulated from each other, by segments 61 and 61$^a$, 51 and 52 and the alternating current brushes to feed said rectifier, 53 and 54 are the direct current brushes to lead off the direct current to the battery 55. Assuming that the switch is moved as described before so that the arm 45 rests on the contact 46, and arm 47 on contact 48 then the alternating current from the main 39 flows through the wire 71 and switch arm 45 and switch contact 46 and the wire 56 to the brush 52, and the other alternating current main 40 supplies brush 51, and the rectified current is taken off at brushes 53, 54, the circuit running from brush 53 by means of conductor 58 to plus pole of battery 55, while the wire 59, arm 47, contact 48, wire 57, brush 54 constitutes the negative path. The switch is held in this position by the magnet 42 and the switch armature 41 in the manner described. Upon the failure of current from the alternating current circuit, all circuits are opened as has also been described before. It may be stated that inasmuch as motor 49, operating the rectifier from the same shaft, 62 is of the character described, it has reached synchronism before the battery circuit is closed, and therefore the rectification occurs at the proper time.

I claim:

1. The combination with a synchronous motor having a field winding, an armature winding having leads for alternating current, a commutator and brushes for supplying exciting current to said field winding, of electromagnetic means responsive to the polarity of said brushes and operative for reversing the connections between the said brushes and field winding.

2. The combination with a synchronous motor having a field winding, an armature winding having leads for alternating current, a commutator and brushes for supplying exciting current to said field winding, of a polarized relay energized from the said brushes and a switch controlled thereby for reversing the connections between said brushes and said field winding.

3. The combination with a synchronous converter having a field winding, an armature winding having leads for alternating current, a commutator and brushes for supplying exciting current to said field winding and also for supplying direct current to an external circuit, of electromagnetic means responsive to the polarity of said brushes and operative for reversing the connections between the said brushes and field winding.

4. The combination with a synchronous converter, having a field winding, an armature winding having leads for alternating current, a commutator and brushes for supplying exciting current to said field winding and also for supplying direct current to an external circuit, of a polarized relay energized from the said brushes and a switch controlled thereby for reversing the connections between said brushes and said field winding.

JAMES KNOX ELDERKIN, Jr.

Witnesses:
GERTRUDE C. MEYER,
D. T. DOBYNS.